(No Model.)
J. H. OBERG.
AX AND AX HANDLE.
No. 556,767. Patented Mar. 24, 1896.
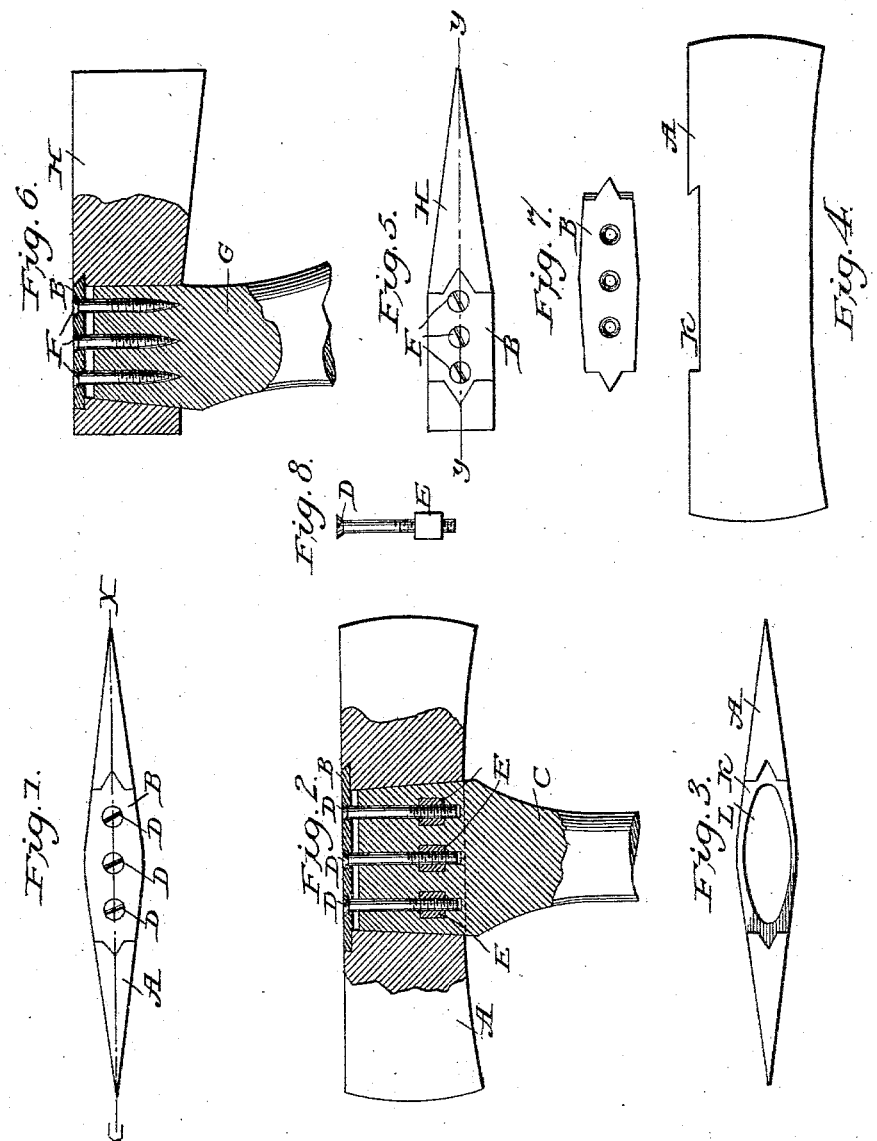
Witnesses.
John Olson.
Nels Westlun
Inventor.
John H. Oberg
By John Olson his Atty.

UNITED STATES PATENT OFFICE.

JOHN H. OBERG, OF TWO HARBORS, MINNESOTA.

AX AND AX-HANDLE.

SPECIFICATION forming part of Letters Patent No. 556,767, dated March 24, 1896.

Application filed July 12, 1895. Serial No. 555,731. (No model.)

*To all whom it may concern:*

Be it known that I, JOHN H. OBERG, a citizen of the United States, residing at Two Harbors, in the county of Lake and State of Minnesota, have invented certain new and useful Improvements in Axes and Ax-Handles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in axes and ax-handles.

The object of my invention is to provide an ax and handle which may be easily made, cheap in construction, and convenient to put together and hold in place. I obtain these objects by the combination of parts fully set forth hereinafter and illustrated in the accompanying drawings, forming a part of this specification, in which similar letters of reference indicate similar parts throughout the several views.

Figure 1 is a top view of my improved ax having the improved handle. Fig. 2 is a central vertical section of Fig. 1 on line $x\,x$. Fig. 3 is a top view of my improved ax having the handle and screw-plate removed. Fig. 4 is a side view of Fig. 3, showing said plate and handle removed. Fig. 5 is a top view of my improved ax, single, or what is known as a "single-bit ax." Fig. 6 is a central vertical section of Fig. 5 on lines $y\,y$. Fig. 7 is a detail top view of Fig. 1, showing screw-plate B removed from the ax and handle; and Fig. 8 is a detail view of Fig. 2, showing bolts D and nuts E.

A represents what is known as a "double-edge ax;" C, the handle, held in place by bolts D passing through plate B and screwed into nuts E, which are preferably placed in handle C.

H, in Fig. 6, represents what is known as a "single-bit ax" having handle G, held in place by screws F passing through screw-plate B and screwed into the handle. It will be observed that the receptacle L for the handle is tapered. The object is to thereby hold said handle in proper place and to prevent the same from passing through said receptacle when the bolts or screws are tightened. It will also be seen that plate B, in Fig. 8, is beveled at one end, the recess in the ax being likewise beveled, said recess in the ax and plate being also pointed at each end. The object thereby is to keep said plate in proper place and at the same time to make it stronger.

It will be readily seen that I may at my option use bolts and nuts, as shown in Fig. 2, to secure the handle in the ax, or I may use only screws, as shown in Fig. 6, and I may make the axes single-edged or double-edged without departing from my invention.

The operation is as follows: When I desire to place the handle in the ax, I first place the nuts in the handle, as seen in Fig. 2, then insert the handle in the receptacle and tighten the screws the usual way. Hence by tightening the screws it will keep the handle in proper place.

Having thus described my invention, what I claim as new, and desire to secure by Letters Patent of the United States, is—

In an ax and handle the combination of an ax provided with a tapered receptacle for the handle, said ax being provided with a recess at one end, said recess being pointed at each end and also partly undercut or beveled at one end, a plate placed in said recess likewise pointed at each end and partly beveled at one end, said handle being provided with nuts into which screw-bolts passing through said plate screw into the handle, substantially as described and shown.

In testimony whereof I affix my signature in presence of two witnesses.

JOHN H. OBERG.

Witnesses:
JOHN OLSON,
CHARLES M. FLOATHE.